United States Patent
Mowshowitz

(10) Patent No.: US 8,103,583 B2
(45) Date of Patent: Jan. 24, 2012

(54) COMPUTERIZED TRANSACTION METHOD AND SYSTEM

(76) Inventor: Zvi Mowshowitz, New York, NY (US)

( * ) Notice: Subject to any disclaimer, the term of this patent is extended or adjusted under 35 U.S.C. 154(b) by 1121 days.

(21) Appl. No.: 11/675,496

(22) Filed: Feb. 15, 2007

(65) Prior Publication Data

US 2008/0015969 A1    Jan. 17, 2008

Related U.S. Application Data

(60) Provisional application No. 60/775,508, filed on Feb. 22, 2006.

(51) Int. Cl.
*G06Q 40/00* (2006.01)
(52) U.S. Cl. .......................................................... 705/39
(58) Field of Classification Search ............... 705/35–37
See application file for complete search history.

(56) References Cited

U.S. PATENT DOCUMENTS

| | | | |
|---|---|---|---|
| 2004/0111358 A1* | 6/2004 | Lange et al. | 705/37 |
| 2008/0033861 A1* | 2/2008 | Jeon | 705/37 |

* cited by examiner

*Primary Examiner* — Jessica Lemieux
(74) *Attorney, Agent, or Firm* — Kenyon & Kenyon LLP

(57) ABSTRACT

A computerized transaction method involves accepting offers at a computer from entities, the offers each comprising an identification of at least one transactable item and a value associated by each entity with the at least one transactable item, identifying a median value derived from the accepted offers, and initiating transactions among at least some of the entities from whom the offers were accepted.

21 Claims, 10 Drawing Sheets

FIG. 5

| Price (Dollars per Euro) | Quantity | Result | Trader |
|---|---|---|---|
| 10 | 1000 | Buy | |
| 1.5 | 100 | Buy | (Alice) |
| 1.3057 | 10000 | Buy | (David) |
| 1.3054 | 5000 | Buy | (Erin) |
| 1.30535 | 2500 | Partial Buy | |
| 1.3053 | 10000 | No Trade | Market Price |
| 1.3051 | 5000 | Sell | |
| 1.305 | 7500 | Sell | (Charlie) |
| 1.304 | 5000 | Sell | |
| 0.666666667 | 100 | Sell | (Bob) |

FIG. 6

| Price (Dollars per Share) | Quantity | Result | Trader |
|---|---|---|---|
| 160 | 100 | Buy | (Ian) |
| 60 | 50 | Buy | |
| 54 | 250 | Buy | (Frank) |
| 51 | 200 | Buy | |
| 50 | 500 | No Trade | (Harry) |
| 49.875 | 100 | Sell | |
| 49.75 | 100 | Sell | |
| 47 | 400 | Sell | |
| 43 | 250 | Sell | (Gina) |

FIG. 7

| Price (Dollars per Unit) | Quantity | Result | Trader |
|---|---|---|---|
| 75 | 50 | Buy | (Karen) |
| 48 | 200 | Buy | |
| 47.5 | 100 | No Trade | Market Price |
| 47.4 | 50 | Sell | |
| 45 | 50 | Sell | (James) |
| 30 | 50 | Sell | (Larry) |
| 0 | 100 | Sell | (US Government) |

FIG. 8

| Price (Dollars per Unit) | Quantity | Result | Trader |
|---|---|---|---|
| 150 | 100 | Buy | (Mike) |
| 100 | 3000 | Buy | (Oliver) |
| 80 | 10000 | Partial Buy (9400 Units) | |
| 75 | 1000 | Sell | (Patrick) |
| 75 | 5000 | Sell | |
| 75 | 4000 | Sell | |
| 50 | 2500 | Sell | (Nora) |

FIG. 9

| Price (Dollars per unit) | Quantity | Result | Trader |
|---|---|---|---|
| 5.03 | 8000 | Buy | Quark |
| 5.02 | 20 | Buy | |
| 5.02 | 45 | Buy | |
| 5.01 | 100 | Buy | |
| 5.01 | 500 | Buy | |
| 5.01 | 3000 | Buy | |
| 5 | 40 | Buy | |
| 5 | 250 | Buy | Smith |
| 4.996 | 10 | Buy | |
| 4.995 | 5000 | Buy | |
| 4.994 | 7500 | No Trade | Trading Price = 4.994 |
| 4.992 | 2000 | Sell (All but 740) | |
| 4.991 | 350 | Sell | |
| 4.991 | 50 | Sell | |
| 4.991 | 150 | Sell | |
| 4.99 | 10000 | Sell | Raymond |
| 4.99 | 400 | Sell | |
| 4.99 | 120 | Sell | |
| 4.99 | 500 | Sell | |
| 4.99 | 1000 | Sell | |
| 4.98 | 50 | Sell | |
| 4.96 | 100 | Sell | |
| 4.96 | 25 | Sell | |
| 4.95 | 200 | Sell | |
| 4.95 | 650 | Sell | |
| 4.925 | 100 | Sell | |
| 4.9 | 2500 | Sell | |
| 4.5 | 10 | Sell | |

FIG. 10

| Price (Winning %) | Quantity | Result | Trader |
|---|---|---|---|
| 1 | 200 | Bets on Home | |
| 0.75 | 450 | Bets on Home | |
| 0.75 | 200 | Bets on Home | |
| 0.74 | 150 | Bets on Home (All but 9.0909 units) | |
| 0.725 | 50 | No Bet | Market Odds |
| 0.7 | 150 | Bets on Visitor | |
| 0.5 | 100 | Bets on Visitor | |
| 0 | 50 | Bets on Visitor | |

Fig. 11

| Price (Spread, Odds) | Quantity | All receive odds of 7 points, 103:100 | Trader |
|---|---|---|---|
| -7.5, 105:100 | 250 | Bets on Home | |
| -7.5, 100:105 | 100 | Bets on Home | |
| -7, 110:100 | 1000 | Bets on Home | |
| -7, 105:100 | 200 | Bets on Home (All but 123.45 units) | |
| -7, 103:100 | 100 | No Bet | Market Spread+Odds |
| -7, 101:100 | 100 | Bets on Visitor | |
| -7, 100:100 | 150 | Bets on Visitor | |
| -7, 100:105 | 500 | Bets on Visitor | |
| -6.5, 105:100 | 10 | Bets on Visitor | |
| -6.5, 100:100 | 350 | Bets on Visitor | |
| -6.5, 100:105 | 100 | Bets on Visitor | |
| -6, 100:100 | 175 | Bets on Visitor | | ent and effort is lost as trades are delayed or do not happen for fear of ending up with a poor price or are sacrificed for the chance at an exceptional price.

COMPUTERIZED TRANSACTION METHOD AND SYSTEM

CROSS-REFERENCE TO RELATED APPLICATIONS

This application claims the benefit of priority, under 35 USC 119(e)(1), of U.S. Provisional Patent Application 60/775,508, filed Feb. 22, 2006, the entirety of which is incorporated herein by reference.

FIELD OF THE INVENTION

This application relates to computerized transactions, and more particularly, to computerized economic transactions between two or more entities.

BACKGROUND OF THE INVENTION

Markets allow participants to make trades that they perceive as having value to them, whether for future investment or for their own use. A combination of factors combine to prevent markets from operating at maximum efficiency. When two goods are exchanged, it requires two traders. One is considered a buyer, one is considered a seller. They need to locate each other and then agree on a price. The buyer wants to pay as little as possible, while the seller wants the buyer to pay as much as possible. Neither side can be sure what the other is willing to accept, and both sides have strong incentives to misrepresent the value of the good or what price they will accept in order to get a better price. Both sides fear being cheated. There is also often considerable cost in this process of locating the other trader and negotiating with them. These effects combine to prevent many trades from occurring even when both sides would prefer to trade at a deviation from their perceived value.

Most participants in a market are either buying or selling the good being traded. Few if any participants are willing to buy or sell depending on the price, and even those who do so generally require a wide and favorable differential or spread in the price he will pay for the good and the price he will pay to purchase it. There is nothing forcing participants to refine their valuation of the good and all trades need to be beneficial enough to overcome status quo bias. Those who approach the market as buyers or sellers know how much they value the good being traded, but that information is not enough to trade in the market and still get full value. A trader must know the market price, locate someone willing to engage in the opposite transaction (a buyer if they wish to sell, a seller if they wish to buy) and then negotiate a price for the exchange. In the extreme case, with a minimal number of buyers or sellers, trades often do not take place at all because of the need to overcome this asymmetrical information even when there would be a lot of value in a trade. These factors do not generally change based upon the number of participants, i.e. when the market is large.

The standard market structure for a financial market like a currency or stock exchange is that a buyer offers a price he would pay, known as a "bid", while the seller offers a price he would accept, known as an "ask." A potential trader has two choices. He can accept a bid or ask price and trade at that price, which normally means sacrificing value to make a trade, or he can enter a bid or ask of his own and hope someone else agrees to match it. Each participant faces a dilemma, balancing the desire to make a trade, to make it quickly and to make it at the best possible price. Much time and effort is lost as trades are delayed or do not happen for fear of ending up with a poor price or are sacrificed for the chance at an exceptional price.

Often the result of this situation is that the market price is not one price but two. There are many who are willing to sell at what is considered the asking price, and there are many who are willing to buy at what is called the bid price. This gap between the bid and the ask represents the inefficiency of the market: The true value of the good lies somewhere between the bid and the ask. Many markets will therefore only trade when a participant wants to trade enough that the participant is willing to pay the asking price or sell for the bid price. This is often what happens when someone needs to execute a trade quickly and thereby seeks a trade "at market." In other cases, someone who wants to trade will ask or bid at a price in between the accepted bid and ask prices, hoping someone will accept the proposed compromise. At other times, the transaction costs involved in the market force the price to be sufficiently non-continuous that there can be no compromise price: For example, a stock can only trade at certain fractions of a dollar per share, and you can sell large quantities easily at one price and buy large quantities easily at the next permissible number.

The problem here in large part stems from the distinction between buyers and sellers. Even those who are willing to both buy and sell act almost as if they were two distinct traders, one who is a buyer and one who is a seller. As a buyer, you try to keep the price low while as a seller you want to keep the price high. However, that is not generally why a potential trader comes to the market—they come to the market because they believe that the two goods being exchanged have a different relative value than they do on the open market. This may be because the current market price does not reflect the future market price, in which case the prospective trader acts as an investor or speculator. It could also be because you can gain utility out of a good in excess of its cost at market, either by using it or reselling it at a different market. Ultimately, that is what markets are for, to get goods into the hands of those who have the most valuable use for them.

The standard implementation of a market for gambling on the outcome of an event shares, being similar in many respects, many of the same problems. The person who runs the market is known as the bookie and he offers a buy and an ask price. Participants trade by accepting the bid or the ask price, which are generally separated by a standard gap of between a minimum of 2% and often 5% or more. This large gap is necessary to compensate them the bookie for the exposure they face if they have miscalculated the price or if an event causes a change that results in a drastic unbalancing in the number of trades. Only very confident traders are willing to pay such high transaction costs and there are entire categories of trades that do not happen at all because this gap acts as a barrier.

To summarize the inefficiencies of current market systems, they (1) give some or all participants incentive to misrepresent the value of the good being traded; (2) allow participants to be taken advantage of by those who have better information about the state of the market; (3) add greatly to the cost of transactions, making the cost of market participation potentially prohibitive depending on how much a traders' valuation differs from the markets'; (4) require buyers and sellers to locate each other and negotiate terms; (5) do not allow for extremely fine distinctions in price; (6) require the prediction of a large fluctuation in price before that prediction is sufficient to cause a potential participant to trade and provide that information to the market due to the need to overcome transaction costs in both directions; (7) completely eliminate entire types of trades due to their inability to consistently overcome those transaction costs; (8) reinforce the natural human tendency towards status quo bias; (9) are sufficiently inefficient to prevent the creation of some markets despite the potential mutual profitability of trades; (10) fail to create a single number that accurately reflects market value. Thus, there is an ongoing need for approaches that can address one or more of these inefficiencies so that trades can happen among those desiring to do so.

BRIEF DESCRIPTIONS OF THE DRAWINGS

FIG. 5 shows a representative example of a batch of trading declarations in a currency exchange.

FIG. 6 shows a representative example of a batch of trading declarations in a market for a stock.

FIG. 7 shows a representative example of a batch of trading declarations in a market for a bond.

FIG. 8 shows a representative example of a batch of trading declarations in a market for a commodity.

FIG. 9 shows a representative example of a batch of trading declarations in a market for options or other derivatives.

FIG. 10 shows a representative example of a batch of trading declarations in a market for wagering on a sporting event.

FIG. 11 shows a representative example of a batch of trading declarations in a market for wagering on a margin of victory in an event (point spread betting).

DETAILED DESCRIPTION

Many of the problems of markets can be solved by eliminating the distinction between buyers and sellers and instead making each a "trader" who is making a two-sided offer. Everyone has some value they place on the good (or goods, since neither need be a currency) being traded. At that value, they are indifferent between buying and selling and if given both choices would choose to do neither. At any higher price, they would consider themselves better off if they sold the good, while at any lower price they would consider themselves better off if they purchased the good. Those who are precise and honest will always have such a price point, although in most markets casual participants will not need to pinpoint that price exactly. At this point, it must be understood that the term "item" or "transactable item" as used herein is intended to mean anything that can be bought, sold, exchanged or otherwise traded or transacted as a result of a transaction, including a betting or wagering position, whether it is a tangible thing being a product, item or money or an intangible like a service, right, duty, obligation or even promise of future performance or transfer. Although the entities and participants discussed in this application are usually people for ease of explanation, "entity" or "participant" as used in this application can refer to any natural or unnatural person, computer, system or any other thing that can transact items.

Figure 1:
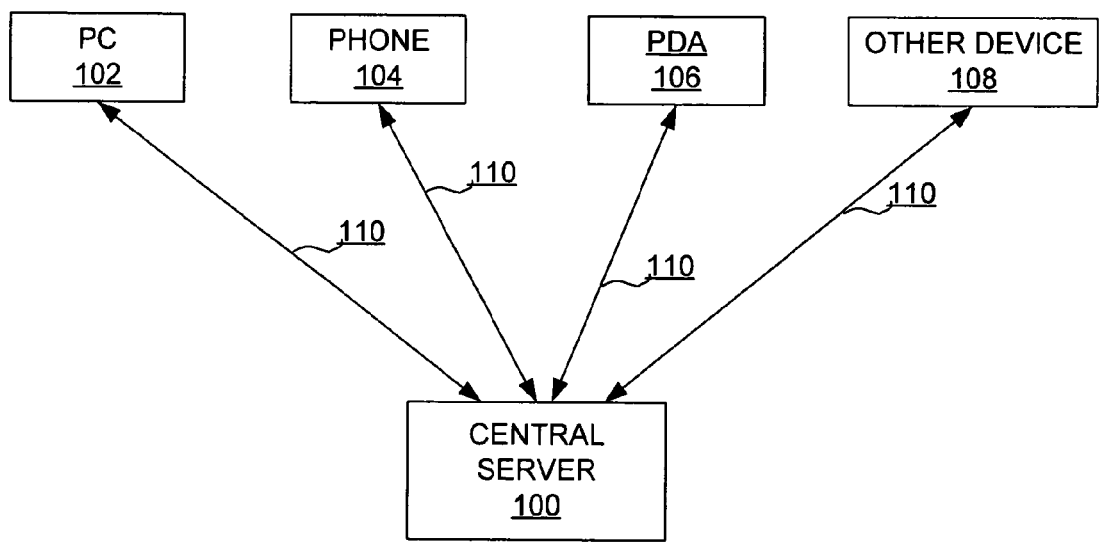
FIG. 1 is a schematic of one example implementation of a market.

As shown in FIG. 1, a central server 100 gathers together certain data from participants participating via a personal computer 102, a phone 104, a personal digital assistant 106 or some other device 108 with connections 110 to the central server 100. The data typically reflects the size of the trade each participant wishes to make and the value that participant assigns to the good to be traded. By not specifying whether each participant will buy or sell, there is an incentive for each participant to correctly identify their true valuation: If they submit a number that is too high then they risk buying when they wish to sell, and if they submit a number that is too low they risk selling when they wish to buy. In contrast, in other markets, the cost of offering an artificially low buy price or artificially high sell price is the risk that you will not trade and sometimes you are rewarded with the price you request.

Advantageously, by having all trades occur at the calculated median value of all the proposed trades that are submitted market inefficiencies can be reduced. Selecting the median provides several benefits. First, it naturally causes half to buy while the other half sells, allowing the maximum number of possible trades. Second, the median price is fully resistant to the exact prices entered by the participants. A buyer can enter 20, 200, 2000 or 2 Billion as the offering price so long as he is confident that the median price will always be below 20; the result will be the same. Someone who wishes to be a seller exclusively could actually enter zero and trade on the same terms as every other seller. The safety of these moves is guaranteed by the law of large numbers, so long as the market is of a sufficient size, and because the possibility of a random fluctuation in price creates a strong incentive for someone with a good read on the price to be willing to serve as an additional buyer or seller, reaping the profits of those fluctuations.

In addition to the direct benefits, the system also has indirect benefits. Among them is a reduction in the problem of status quo bias. People have a tendency to overvalue what they own and undervalue what they do not own, causing them to overvalue anything they sell and undervalue what they seek to buy. Once they are no longer locked into one role, they are forced to consider what they consider the true value of what is being traded without reference to what they currently have and changing the alternatives from a trade and the status quo to two trades. While this does not eliminate all the problems caused by status quo bias, it does reduce them.

One example implementation variant of a market employing the invention will now be described. In this example, the market executes trades in batches. Instead of offering only to purchase or sell the good being traded, participants are required to offer both by declaring how they value the good being traded and the quantity they wish to trade. By stating this value, they are saying both that they would purchase the good at any lower price or sell the good at any higher price. The median dollar value for the current batch of trades is then calculated, and it is set as the price that all buyers will pay and all sellers will receive. Note that the calculation is based on the median dollar value, not on the median number of value entries; in other words two trades of $100 each at the same price are considered the same as one $200 trade at that price.

At this point it should be understood that there may also be a fee structure associated with administration of the market that may be imposed. In some cases that fee may be reflected in a "participant fee" whereby a fee is only charged to become a participant, irrespective of the number or size of trades by that participant. In other cases, fees may be imposed on a per-trade basis. Advantageously, however, since more trades can occur through use of the claimed invention, a lower fee can be charged to reap the same return available with current fee per-trade based markets. In yet other cases, fees may be imposed based upon size of the trade (in terms of number of good to be transferred). Since the addition of fees adds back in some market inefficiency and is independent of the inventive approach, for purposes of the examples and understanding of the approach in general, fees are ignored. Nevertheless, it is expected that commercial implementations will involve charging of fees in some form, and doing so should not be considered a deviation from the invention despite their introduction of market inefficiency.

Those who declared a higher value for the good than the median price become buyers, pay the median price and receive the good. Those who declared a lower price for the good than the median price become sellers, receive the median price and pay the good. In both cases, they trade the amount they specified when declaring their valuation of the good. Those who declared the exact price determined to be the median value (or in some cases are within a specified window around it) do not trade, since a trade would not have meaningful value to them; in the case of an imbalance in the dollar value of those above and below the median value, to neutralize the imbalance, the window can be adjusted slightly or those with the value closest to the median whose values are on the side with the greater value have their trade size reduced as necessary to equalize the amounts bought and sold.

One representative simplified example implementation involving use of the invention is now described with reference to FIG. 5, relating to a currency exchange where, for example, traders exchange Dollars for Euros and vice versa. In a given batch of trades, there might be ten thousand participants in the market, each wishing to trade a varying dollar amount ranging from $100 to $1 Million. Some of the participants might be as follows. Alice wants to go on a trip to Europe, so she values Euros highly so long as she receives the market price and thus enters $1.50 per Euro. Bob lives in Germany wants to go on a trip to America, so he needs Dollars and enters $1 per Euro. Charlie, David and Erin specialize in predicting the exact relative value of currencies. Charlie feels that the Dollar is going to rise slightly and enters $1.305 per Euro. David feels that the Dollar will fall and enters $1.3057 per Euro. Erin predicts that the median value should remain essentially unchanged, and enters the old value of $1.3054. She doesn't know whether she will trade or what she will be buying or selling if she does, but she is convinced that any trade she makes will have value.

Calculation by the system using all the valuation entries then determines the median price to be $1.3053 per Euro. All traders who entered a value less than that will exchange Euros for Dollars at the rate of $1.3053 per Euro and those who entered a greater value will exchange Dollars for Euros at the rate of $1.3053 per Euro. Alice thus buys Euros at $1.3053 and Bob buys Dollars at the same rate, despite neither knowing anything about the market. They can now go on their trips without worrying that they were overcharged and can exchange any extra money back the same way when they return. Charlie buys Dollars at $1.3053 Dollars per Euro, and David buys Euros at that price; whoever is right about future prices will profit and the other will suffer a loss. Both received value based on what they feel is the true exchange rate. Assuming transaction fees are small enough, or this market waives such fees for example, for those whose valuations are very close to the median value, Erin will be buying Euros at $1.3053, despite her valuation being very close to that value, and receives what she believes to be a profit of $0.0001 per dollar exchanged. Otherwise, Erin would be among those who do not transact.

Another representative simplified example implementation involving use of the invention is now described with reference to FIG. 6, relating to a stock exchange. Such an example can be understood with respect to trading in stock of XYZ corporation. Here, the valuations are given as dollars per share and the price will likely be less precise. Once again we have traders with different valuations of the stock: Frank thinks XYZ will do well and it is worth $54 per share, Gina feels XYZ will do badly and thinks it is worth $43, Harry thinks it is worth $50, Ian thinks it is the next big thing and is worth $160. All of them enter their trades with varying dollar values as do many other traders. The median price turns out to be $50. Harry does not trade as the median value coincides with his valuation. Gina sells at $50 and gets what she feels is $7/share in value. Frank buys at $50 and gets what he believes is $4/share in value. Ian gets what he feels is a steal, getting what he believes is almost $110/share in value. Note that his drastically variant valuation does not cost him anything more. If Gina does not own any shares of XYZ corporation, she is now short the shares of XYZ she has sold. She can either trade again to eliminate this position or she can retain this short position since she believes the stock is currently overvalued. The market for XYZ is liquid, so she can cover her position in another batch at any time.

Another representative simplified example implementation involving use of the invention is now described with reference to FIG. 7, relating to a bond market. In this case, the bonds are US treasury bonds, and they pay $100 on Jan. 1, 2020. Participants calculate what they feel is the net present value of such a bond and enter that as their value, or they may have a reason to value it differently. James thinks that a $100 bond is worth $45 in net present value, so he enters $45 knowing he will either buy a bond below its value or sell one above its value. Karen wishes to invest in these bonds to save for retirement safely and wants to buy them so long as she gets fair value; rather than have to shop around, she enters $75 knowing that she will be buying the bonds at market price. Larry wishes to buy a house, and needs to cash in his bonds; this causes him to value dollars more than the bonds so he enters $30 knowing he will sell. The US Government itself uses this market to issue its bonds, so each batch it sells a small number of bonds and enters the value $0 to guarantee that it will raise a fixed amount of money at market value. Those who trade will determine that value, and it will rise and fall based on changes in the opportunity cost of money, the good faith and credit of the United States and everything else that currently determines bond prices.

Through calculation of the median value as above, the price is determined to be $47.50 per bond. The US Government, James and Larry sell at $47.50 per bond. If James or Larry sells more bonds than he owns, he then must cover his position or remain short and obey the bond market rules for being short. Karen buys bonds at $47.50. In addition, numerous others both buy and sell.

The same is true for a corporate bond market where values trade relative to "par." In such cases, the values would simple be a premium over part or a discount to par. The calculation would result in a median value that is either a discount or premium relative to par and that value would be where all transactions occur.

Another representative simplified example implementation involving use of the invention is now described with reference to FIG. 8, relating to a commodities market involving, for example, barrels of oil. In this case, we once again have a variety of participants with a variety of motivations. Mike wants oil for his fleet of trucks, and has no choice but to buy it at almost any price. Nora has oil to sell sitting in her warehouse. Oliver feels he can predict the future trading price of oil. Mike enters $150 per barrel since he must buy it. Nora enters $50 per barrel since the only value of the oil to her is that she can sell it. Both are accepting the market price, and while they know what to expect they don't have any reason to take any chances. Oliver hears about an oil shock and realizes that the old price of $75/barrel is going to rise to what he guesses is $100/barrel so he enters $100. Patrick does not know about the shock, so he calculates the future price as the old one, $75.

Due to Oliver and others who know about the shock, the median dollar price rises from $75 in the last batch to $85 in this one. Nora is pleasantly surprised to receive $85 a barrel. Mike is forced to pay $85, a lot more than he expected but still less than he needs the oil. Oliver gets his oil at $85, and Patrick sells oil at $85. Nora delivers her oil, Mike receives his. Patrick has no oil to deliver, so by the time the oil is deliverable, he must purchase the oil to cover his position; if the price continues to rise and he can only find oil in the market, he will take a loss. Oliver will later sell his oil at the new market price, hopefully taking a profit.

Another representative simplified example implementation involving use of the invention is now described with reference to FIG. 9, relating to trading of options or other derivatives, for example, a derivative of the stock of XYZ corporation. Once again the various participants would enter what they felt was the true value of the derivative to them. Quark might calculate that he can hedge the position in either direction for $5.03 by using other derivatives and stocks. Raymond wants to bet against XYZ and is using this derivative for leverage, entering $4.99. Smith wants to bet on XYZ and trades here for the same reason as Raymond, entering $5.00. The calculated median price for all value entries turns out to be $5.01. Quark hedges his new position, confident that he will make almost $5.03/unit in profit. Raymond and Smith trade at $5.01/unit.

Yet another representative simplified example implementation involving use of the invention is now described with reference to FIG. 10, relating to a "market" involving wagering on the winner of a sporting event, for example the winner of the local bowl game. Participants enter what they feel are the odds that one team, the home team, will win the game and they enter a broad range of odds. A fan wishes to bet on the home team, so he enters a probability of 1, and a fan of the visiting team enters 0. More realistic participants enter their expectation of the odds. Here, the median odds value would be calculated such that the odds are equal to the ratio of dollars wagered on each side; because there are odds involved, more money must be wagered on the favorite than on the underdog if the two sides are to be balanced. In this example if the median value calculates to 0.725, the ratio is 725:275. When the home team wins, the visiting team's fan loses his wager and pays his trade value to the market. The home team fan and the observer who entered 0.75 both collect profits of (275/725) times the money they wagered.

Yet another representative simplified example implementation is now described with reference to FIG. 11, relating to wagering on the outcome of a sporting event based on a point spread. In point spread betting, there are two separate prices: There is the number of points that the home team adds or subtracts from its score, known as the point spread, to make the odds of this event close to 50%, which here defines the terms of the trade: The trader buying the home team receives payment if that team's score, minus the other team's score, plus the point spread is greater than zero. If it is less than zero then the visiting team purchaser receives payment, and if the result is zero all funds are refunded. In an additional or alternative approac, there is the price traders must pay for a contract defined in this way. In this case, everyone enters what they feel would be a close to fair point spread. Assume that most participants believe the home team is favored by, for example, 6.5, 7 or 7.5 points. They then refine their position by input of the exact odds they expect. Again, the median is calculated. In this example, the market sets 7 as the median dollar value for the point spread, so the winner will be determined by comparing the margin of victory to 7 points. To balance the money and generate as many mutually desired transactions as possible, exact odds are then calculated and the calculation is made in the same manner as it was in the wagering on the winner of the event, with the odds at 7 points becoming 103:100 in favor of the home team. All those who entered more than 7 points, or 7 with odds greater than 103:100, lose the amount wagered. Those who entered less than 7 points or 7 with odds less than 103:100 win and receive $103 for every $100 wagered minus the betting fee.

Ability to Both Buy and Sell

Although in some cases, it will be difficult to use the approach in a market that lacks sufficient quantities of both goods to buy or sell (as determined by availability, valuation and market price). This is not a problem when applied to goods for which there is a liquid market. Investors are frequently known to short stocks they do not own, knowing that they can deliver the stock later on upon request by purchasing it at the market rate. Thus, the approach can be used for any good for which there is a liquid market. In a liquid market, if a trader ends up with a negative position in one good or the other, that provides a strong value to him in covering that position in a future batch of trades assuming that he does not want to retain that position. If a negative position would be particularly bad, then that gives a purchase of the good great value and ensures that the participant will enter a price above market in a future trading batch. This is particularly true for any good that can be bought and sold in generic units.

From the Participant's Perspective

A schematic of the market including the central server facilitating the trades, is shown in FIG. 1. The central server 100 receives data from the individual participants, who communicate with the central server by personal computer 102, phone 104, personal digital assistant 106 or other device 108 through connections 110, e.g., internet connections. The trader or participant participates by personal computer 102, phone 104, personal digital assistant 106 or other device 108, which have access to the assets sufficient to permit a trade.

Figure 2:
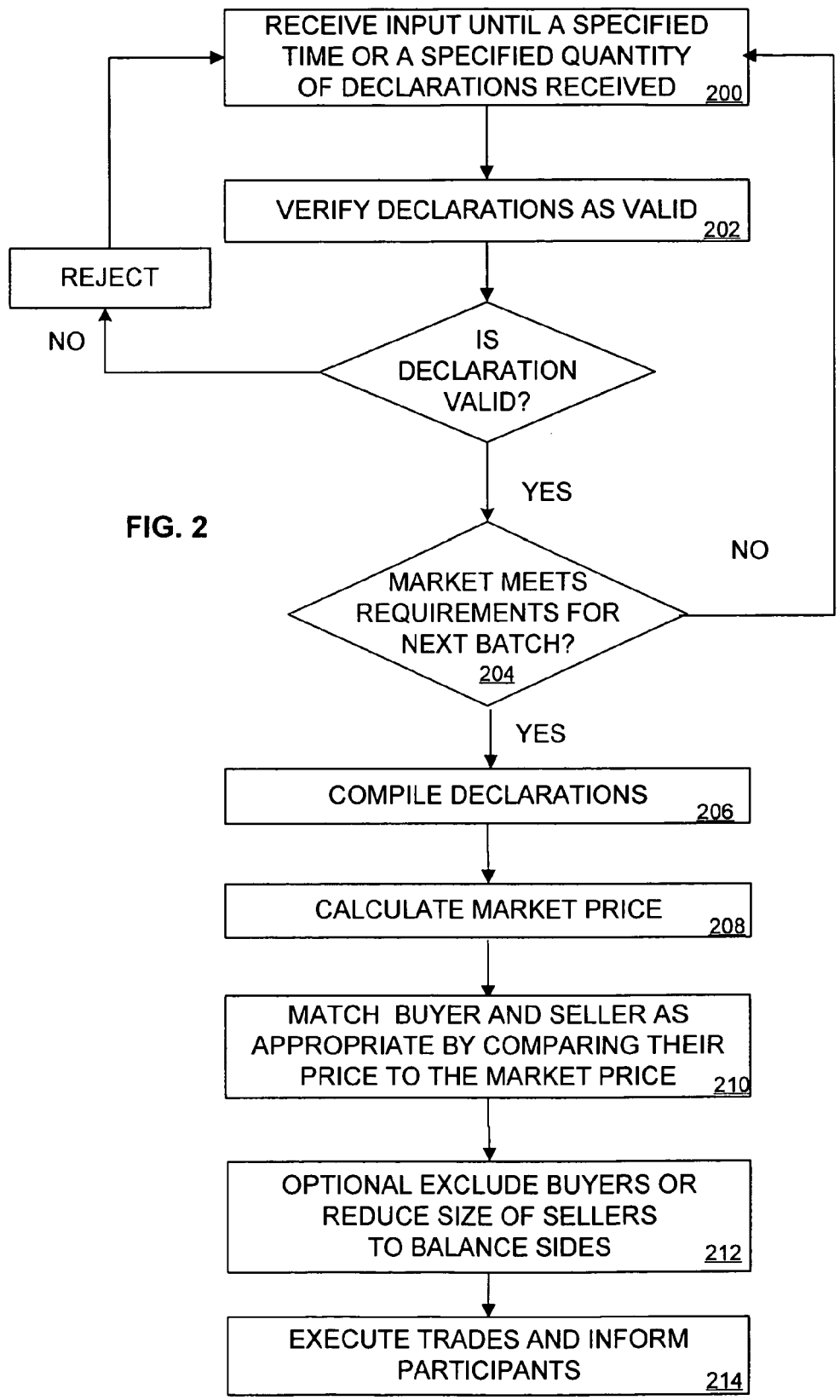
FIG. 2 is a simplified flow chart of the operation of the example market implementation of FIG. 1 from the perspective of a participant.

From the point of view of a participant, the market acts as represented by FIG. 2. Different traders will have different goals. Some will be looking to buy or sell exclusively, at least during a given trading batch. As noted above, there is nothing stopping someone who wishes to buy or sell exclusively from entering a price that is artificially distinct from the expected or current market price, but will guarantee them the trade that they want at the market price of the next batch. While those whose value of the good is similar to the market price have a strong incentive to correctly pinpoint that value, those whose value is distinct from the range of possible market values need not worry and are in no danger of engaging in an undesired transaction. An end user not familiar with the market could even inform the system that he simply wishes to buy or sell 'at market,' at which point the system would automatically enter a price that is well outside the possible range of market values and thereby execute the desired market trade without the end user ever knowing how the market price is set. To this naïve trader the system can be made invisible, and all he ever sees are the reduced costs he pays to trade.

Other traders will seek to enter a value very close to the market rate, representing what they view as the future market value of the good. Their time frame could be as little as the next batch, which in large markets could occur a second later or even sooner, as long as a hundred years or more or anything in between. A trader confident that any fluctuations do not represent a change in future value could enter the current market price, confident that either he would make a trade that has value or no trade at all. His interaction with the market from his perspective can be seen in FIG. 2.

Specifically, FIG. 2 shows the steps of the central server in facilitating a trade. First, the central server receives input until a specified time or a specified quantity of declarations 200 are received. Then, it verifies that the declarations are valid 202. If they are, the central server determines whether the market meets all the requirements for the next batch 204. If the answer is yes, it compiles all the declarations 206, calculates the market price 208 and assigns buyers and sellers by comparing their declared prices and the market price 210. Then, the server will exclude buyers or reduce the size of sellers to balance the two sides if necessary 212, execute the trades and inform the participants 214. If the market does not meet the requirements for the next batch, the server returns to the first step to receive additional input.

From the Market's Perspective

Figure 3:
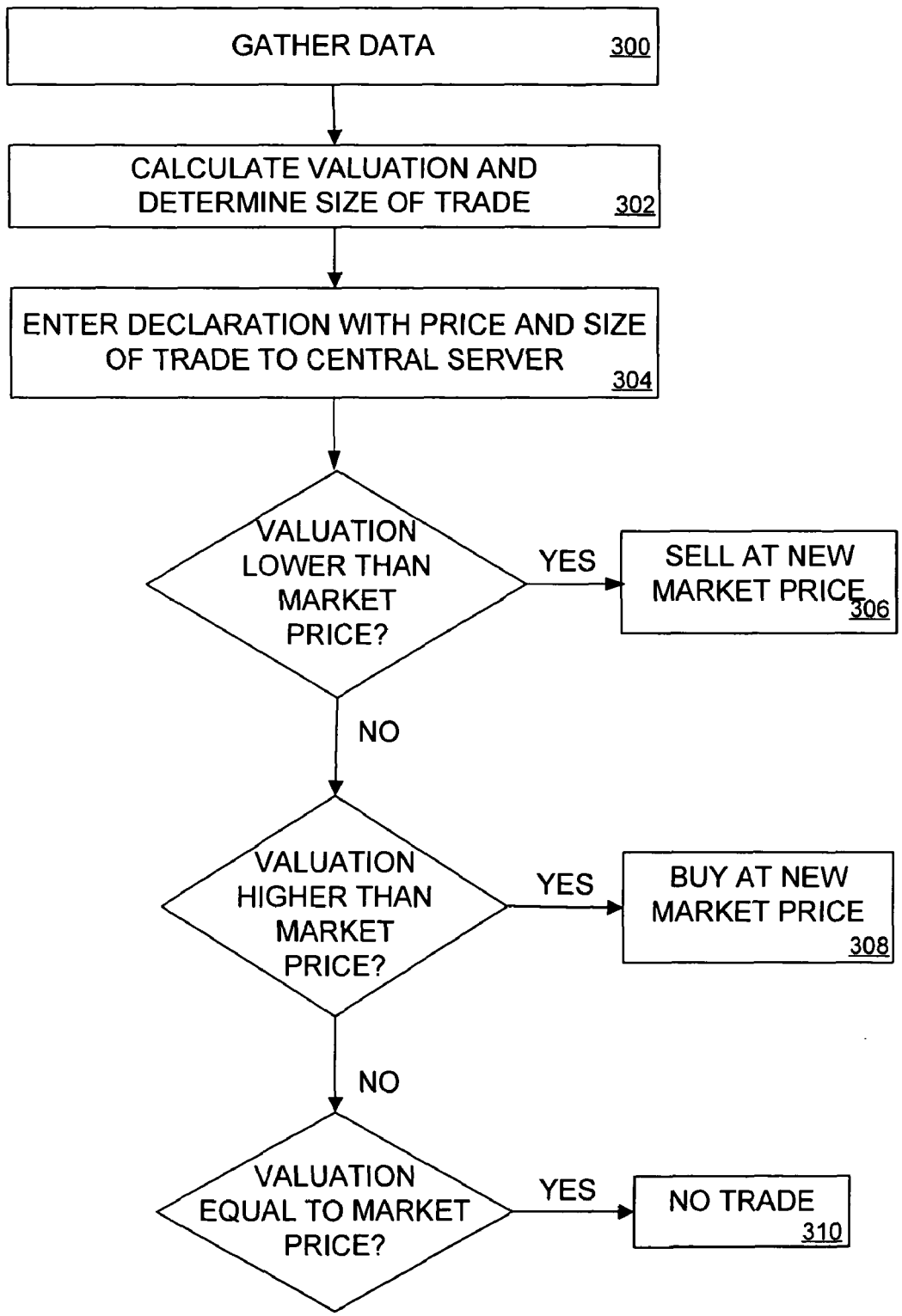
FIG. 3 is a simplified flow chart of the operation of the example market implementation of FIG. 1 from the perspective of the market.

FIG. 3 shows the steps of the participant, i.e., the trading process from the perspective of the market. First, the participant gathers data 300, calculates his valuation and determines the trade he wants to make 302. Then, he enters his declaration to the central server, including the price and size of the trade 304. After the batch is complete, the participant learns how his valuation compares to the market price. If his valuation equals the market price, no trade is executed 310. If the participant's valuation is lower than the market price, then he sells at the new market price 306. If the participant's valuation is higher than the market price, he buys at the new market price 308.

Figure 4:
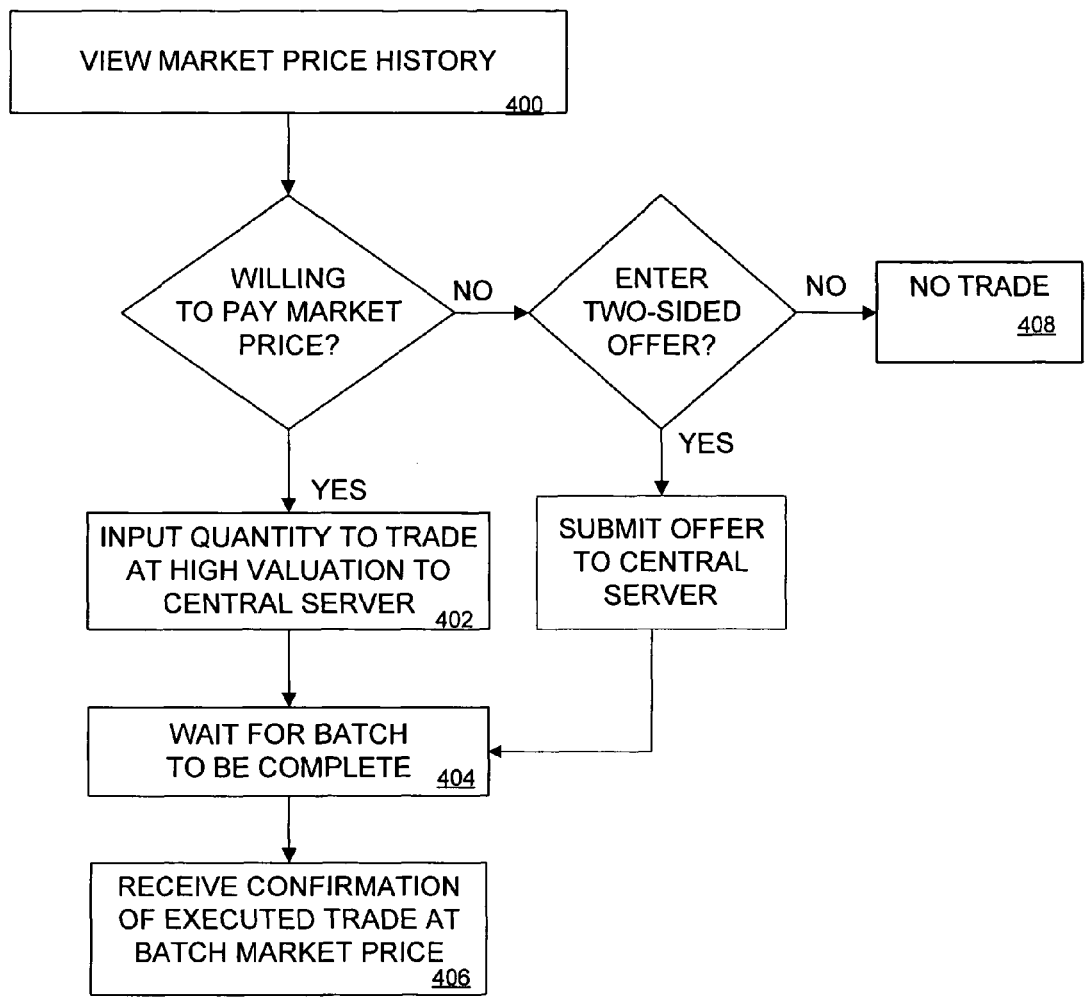
FIG. 4 is a simplified flow chart of the example market of FIG. 1 from the perspective of a participant who wishes only to buy or sell at market price.

FIG. 4 shows the steps of an exclusive buyer or seller participating in the market. First, the buyer views the price history of the market 400 and decides whether she wants to pay the market price. If the buyer decides that she doesn't want to pay the market price, she may enter a two-sided offer, which is detailed in FIG. 3. If the buyer does not want to enter a two-sided offer, then there is no trade 408. If the buyer wants to pay market price, she inputs the quantity to trade at an extremely high valuation and uploads this information to the central server 402. The buyer then waits for the batch to be complete 404 and the trade is executed at the new batch's market price 406.

Variations: Price Selection

Although use of the median price is the ideal case, in reality other implementations may be more commercially suitable so alternative methods can be used to differing advantage. For example, a modified median value can be used to try and allow some of those who entered the median value to transact at a number slightly above or below the median value, for example by allowing participants to optionally specify an over median or under median bias and using those with differing biases to form matches among those who entered the median price thereby allowing some or all of those who entered the median value to transact. Similarly, an opposite approach could be used in which transactions will be allowed for each of those participants who entered a value that differs from the median by a deviation amount. Depending upon the particular case, the deviation amount could be user specified, pre-specified by the system, calculated as a function of, for example, one or more offers, inputs or even the median value. Alternatively, a mean value can be used in some implementations, although doing so may lead to an imbalance in the amount traders wish to buy and sell. In addition, a further potential disadvantage is that use of the mean is more susceptible to market manipulation than median value. A mode value can also be used in some implementations, but it too can be problematic in some cases for the same or similar reasons.

Variations: Transaction Size

Once submitted, transactions may or may not be eligible for modification or cancellation prior to the handling by the central server of a batch of trades involving that transaction. Transaction size will typically be fixed at a constant value by the participant at the time of declaration of their trade, but this need not always be the case. In some cases, the amount traded can be a function of the market price in relation to the participant's true value, allowing him to trade more when his valuation differs greatly from the market price, so long as these requests are allowed by the market and submitted simultaneously with the declaration. In those cases, the median calculation would be modified to find the amount for which the price selected would become the median price after the determination of the size of all trades.

Variations: Privacy of Declarations

Advantageously, with some implementations, the market can operate with complete secrecy in terms of declarations of price, identity or affiliation of prospective traders, and even the identity of who bought and sold a good and in what quantities, thereby allowing traders to reveal their true preferences without fear that they will be needlessly giving away information. This is the typical way to operate a market as described herein. However, in some alternative implementations, a form of modified secrecy could be used whereby certain or all of the above or other information would be collected for statistical, regulatory or marketing purposes. Thereafter some form of the collected information could subject to review by those running the market, regulators, if any, or the public or it could be disseminated in raw, "sanitized" or categorized form to for a fee.

Variations: Gambling

In addition to the above, other "market" implementations can be created for wagering on any event, including events other than sports; it can exist for anything upon which people may bet. For example, implementations of the approach can be used for betting on something as mundane as the actual minute of closing for the local pizza restaurant. The method of determining which bets win and which lose, and which ones are considered to be voided (or to 'not have action') can vary. Depending upon the particular implementation, the bets can be expressed in terms of money amount wagered, in terms of amount to be won, in terms of the base amount (the smaller or larger of the two numbers) or by some other method. Similarly or alternatively, limits can be placed upon the quantity that one person may trade in the market in any given batch or over all batches, as is commonly done today, if those who run the market so desire. The market can even be enlarged to include offers made at other markets, allowing those who run the market to make a profit beyond the fees they charge by automatically placing a wager elsewhere at any number more generous than what would otherwise be the median value and using that wager to choose the new appropriate median value (i.e. the one that guarantees balanced action). In still other variants, a market can be modified based upon a ranking or judgment relating to past performance of different participants, for example, by giving more weight to those with good records than those with bad records either at predicting the future trading price or the outcome of the bet, thereby allowing those who run the market to wager profitably on the outcome of the event.

Components for Implementing the Claimed Approach

Figure 12:
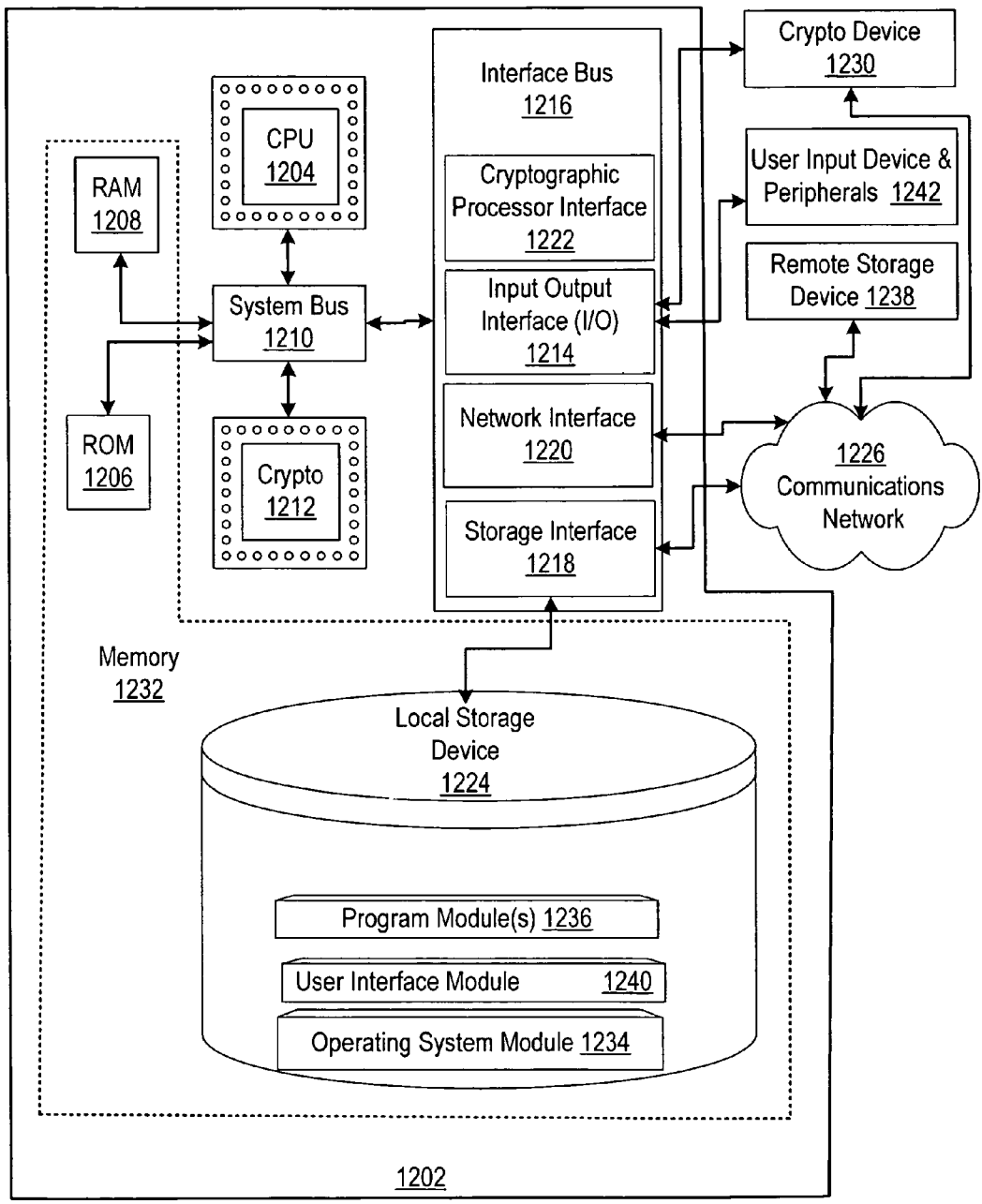
FIG. 12 shows a representative example of a computer suitable as a central server to implement some aspects of the invention.

FIG. 12 is a representative generic example of a computer suitable as a central server to implement some variants of the approach described herein. In general, a suitable computer 1202 will comprise a central processing unit (CPU) 1204, a read only memory (ROM) 1206, a random access memory (RAM) 1208 most frequently, although not necessarily, all interconnected and/or communicating through a system bus 1210. Optionally, a cryptographic processor 1212 may also be connected to the system bus to implement or become part of an implementation of a security policy. Various components in the computer drive signal embodying information throughout the system. Such transmission and reception of signals embodying information throughout the computer may further be transmitted, received, and the causes of return and/or reply signal communications beyond the instant computer to: communications networks, input devices, other computers, peripheral devices 1242 and/or the like. Of course, any of the above components may be connected directly to one another, connected to the CPU 1204 and/or organized in the manner of any of numerous computer system variations.

The CPU 1204 comprises at least one high-speed data processor adequate to individually or in conjunction with other processors execute program modules for executing user and/or system-generated requests. The CPU 1204 may be a microprocessor such as AMD's Athlon, Duron and/or Opteron; IBM and/or Motorola's PowerPC; Intel's Celeron, Itanium, Pentium, Xeon, and/or XScale; and/or the like processor(s) or distributed processors such as are employed in various single instruction, multiple data SIMD or multiple instruction, multiple data MIMD type-computers. The CPU interacts with memory through signal passing through conductive conduits to execute stored program code according to conventional data processing techniques. Such signal passing facilitates communication within the system and beyond through various interfaces. Should processing requirements dictate a greater amount speed, further mainframe or super computer architectures or variants may similarly be employed. Alternatively, should deployment requirements dictate greater portability, smaller Personal Digital Assistants (PDAs) or other handheld units may be employed provided they have the requisite computing capability to accomplish their assigned task(s).

The power source for the computer can be of any standard form for powering small electronic circuit board devices such as the following power cells: alkaline, lithium hydride, lithium ion, nickel cadmium, solar cells and/or the like. Other types of AC or DC power sources may be used as well. In the case of solar cells, in one variant, the case has an aperture through which the solar cell may capture photonic energy to thereby provide electric current to the various components. In one example, an outside power source is alternatively provided through a connection across the I/O interface 1214, for example, a USB and/or IEEE 1394 connection, Such connections carry both data and power and are therefore a suitable source of power.

Interface bus(es) 1216 may accept, connect, and/or communicate to a number of interface adapters, conventionally although not necessarily in the form of adapter cards, such as but not limited to: input output interfaces (I/O) 1214, storage interfaces 1218, network interfaces 1220, and/or the like.

Optionally, cryptographic processor interfaces 1222 similarly may be connected to the interface bus 1216. The interface bus 1216 allows components of the computer to communicate with one another.

Storage interfaces 1218 may be present to accept, communicate, and/or connect to a number of storage devices such as, but not limited to: storage devices 1214 such as fixed or removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Optional network interfaces 1220 accept, communicate, and/or connect to a communications network 1216. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. For purposes of the above, the network interface may simply be regarded as a specialized form of an input output interface. Further, multiple network interfaces 1210 may be used to facilitate communication over various communications network types. For example, multiple network interfaces may be employed to allow for the communication over broadcast, multicast, and/or unicast networks. Similarly, wireless interfaces can be used to facilitate communication over a wireless network.

Input Output interfaces (I/O) 1214 accept, communicate, and/or connect to user input devices and/or peripheral devices 1218, cryptographic processor devices 1230, and/or the like. I/O 1214 may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A representative common output device is a video display, which typically comprises a Cathode Ray Tube (CRT) or Liquid Crystal Display (LCD) based monitor with an interface (e.g., DVI circuitry and cable) that accepts signals from a video interface (however any type of display, including plasma will work). The video interface composites information generated by the computer and generates video signals based on the composited information in a video memory frame. Typically, the video interface provides the composited video information through a video connection interface that accepts a video display interface (e.g., a DVI connector accepting a DVI display cable).

Optionally, if user input is to be allowed (for security or data manipulation purposes), one or more user input devices can be included. Such devices may be, depending upon the type of input to be allowed, card readers, dongles, finger print readers, gloves, graphics tablets, joysticks, keyboards, mouse (mice), trackballs, trackpads, retina readers, and/or the like.

Peripheral devices may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like. It should be noted that although user input devices and peripheral devices may be employed, variants may be embodied as an embedded, dedicated, and/or headless device, wherein access would be provided over a network interface connection.

Optionally, cryptographic units such as, but not limited to, microcentral servers, processors 1212, interfaces 1222, and/or devices 1230 can be included, and/or communicate with the system for security. By way of example, an MC68HC16 microcentral server, commonly manufactured by Motorola Inc., may be used for and/or within a representative cryptographic unit. The MC68HC16 microcentral server utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of a CPU. Other commercially available specialized cryptographic processors include VLSI Technology's 33 MHz (12868 or Semaphore Communications' 40 MHz Roadrunner 184.

Generally, any mechanization and/or embodiment allowing a processor to affect the storage and/or retrieval of information is regarded herein as memory 1232. Any of various forms of memory 1232 can be used individually or in combination. For example, the computer can be configured with and use on-chip CPU memory (e.g., registers), ROM 1206, RAM 1208, and a storage device 1224. The storage device 1224 can be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like.

The memory 1232 may contain a collection of program and/or database modules and/or data such as, but not limited to: operating system module(s) 1234 (operating system) and those program module(s) 1236 necessary for implementing the instant approach, in whole or part. These modules may be stored and accessed from the storage devices and/or from storage devices accessible through an interface bus. Although non-conventional software modules such as those in the module collection, typically, are stored in a local storage device 1224, they may also be loaded and/or stored in memory such as: peripheral devices, RAM, remote storage facilities 1238 through a communications network 1226, ROM, various forms of memory and/or the like.

The operating system module 1234 is executable program code facilitating the operation of the central server. Typically, the operating system facilitates access of I/O, network interfaces, peripheral devices, storage devices and/or the like. The operating system may be a highly fault tolerant, scalable, and secure system such as Apple Macintosh OS X (Server), AT&T Plan 9, Be OS, Linux, Unix and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. The operating system will communicate to and/or with other modules, including itself. Most frequently, the operating system communicates with other program modules, user interfaces and/or the like. For example, the operating system may contain, communicate, generate, obtain and/or provide program module, system, user and/or data communications, requests and/or responses. The operating system, once executed by the CPU 1204, may enable the interaction with communications networks, data, I/O, peripheral devices, program modules, memory, user input devices, and/or the like. The operating system may provide communications protocols that allow the computer to communicate with other entities through a communications network 1226. Various communication protocols may be used by the computer as a subcarrier transport mechanism for interaction, such as, but not limited to: multicast, TCP/IP, UDP, unicast and/or the like.

A user interface module 1240 is stored program code that is executed by the CPU 1204. The user interface may be a conventional graphic user interface as provided by, with, and/or on top of operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation and/or operation of program modules and/or system facilities through textual and/or graphical facilities. The user interface provides a facility through which users may affect, interact and/or operate a computer system. A user interface may communicate to and/or with other modules in a module collection, including itself, and/or facilities of the like. Most frequently, the user interface communicates with operating systems, other program modules and/or the like. The user interface may contain, communicate, generate, obtain and/or provide program module, system, user and/or data communications, requests and/or responses.

Information Server

An information server module is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a Central server based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications and/or the like. An information server may communicate to and/or with other modules in a module collection, including itself, and/or facilities of the like. Most frequently, the information server communicates with the Central server database, operating systems, other program modules, user interfaces, Web browsers, and/or the like.

Access to the Central server database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Central server. In one example, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one example, the parser may generate queries in standard SQL by instantiating a search string with the proper join/select commands based on the tagged text entries, wherein the resulting command is provided over the bridge mechanism to the Central server as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

Web Browser

A Web browser module is stored program code that is executed by the CPU. The Web browser may be a conventional hypertext viewing application such as Microsoft Internet Explorer, Netscape Navigator, Firefox, or Opera. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information from/to users, user agents, and/or the like.

Central Server Database

A Central server database module may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Central server database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Central server database is implemented as a data-structure, the use of the Central server database may be integrated into another module such as the Central server module. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated. In some implementations, in addition to tables reflecting prospective traders and values, the database module optionally can include other tables having fields for information such as, but not limited to: a user name, user address, user authorization information (e.g., user name, password, biometric data, etc.), user credit card, organization, organization account, Central server-unique identifier, account creation data, account expiration date; and/or the like. In some example commercial implementations, user accounts may be activated only for set amounts of time and will then expire once that time has expired. It should be noted that any unique fields may be designated as a key field throughout. In some implementations, the tables will be decentralized into their own databases and their respective database central servers as necessary (i.e., individual database central servers can be specified for each table ore a subset of tables). Employing standard data processing techniques, one may further distribute the databases over several computer systemizations and/or storage devices. Similarly, configurations of the decentralized database central servers may be varied by consolidating and/or distributing the various database modules.

A Central server database may communicate to and/or with other modules in a module collection, including itself, and/or facilities of the like. Most frequently, the Central server database communicates with a Central server module, other program modules, and/or the like. The Central server database may contain, retain, and provide information regarding other nodes and data.

Cryptographic Server

A cryptographic server module is stored program code that is executed by the CPU, cryptographic processor, cryptographic processor interface, cryptographic processor device, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Central server may encrypt all incoming and/or outgoing communications and may serve as node within a virtual private network (VPN) of a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for a file. A cryptographic module may communicate to and/or with other modules in a module collection, including itself, and/or facilities of the like. The cryptographic module supports encryption schemes allowing for the secure transmission of information across a communications network to enable a Central server module to engage in secure transactions if so desired. The cryptographic module facilitates the secure accessing of resources and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Central Server

The Central server module is stored program code that is executed by the CPU. Among other things, the Central server module functionally implements the inventive approach and may further be involved in accessing, obtaining and the provision of information, services, transactions, and/or the like across various communications networks. The Central server enables users to engage in the transactions as well as access data and/or other services across a communications network, in commercial implementations, typically in a secure manner. The Central server coordinates with the Central server database to identify inter-associated items in the generation of entries regarding any related information. The Central server module enabling access of information between nodes may be developed by employing standard development tools such as, but not limited to: (ANSI) (Objective-) C (++), Apache modules, binary executables, Java, Javascript, mapping tools, procedural and object oriented development tools, PERL, Python, shell scripts, SQL commands, web application server extensions, WebObjects, and/or the like. In some implementations, the Central server module employs a cryptographic server to encrypt and decrypt communications. The Central server module may communicate to and/or with other modules in the module collection, including itself, and/or facilities of the like. Most frequently, the Central server module communicates with a central server database, operating systems, other program modules, and/or the like. The Central server module itself may contain, communicate, generate, obtain, and/or provide program module, system, user, and/or data communications, requests, and/or responses.

Distributed Central Server Variants

The structure and/or operation of any of the node central server components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may also be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple central servers and/or storage devices; e.g., databases. All program module instances and central servers working in concert may do so through standard data processing communication techniques.

The specific configuration of the Central server will necessarily depend on the context of system deployment. Factors such as, but not limited to, the budget, capacity, location, and/or use of the underlying hardware resources may affect deployment requirements and configuration. Regardless of whether the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

Figure 13:
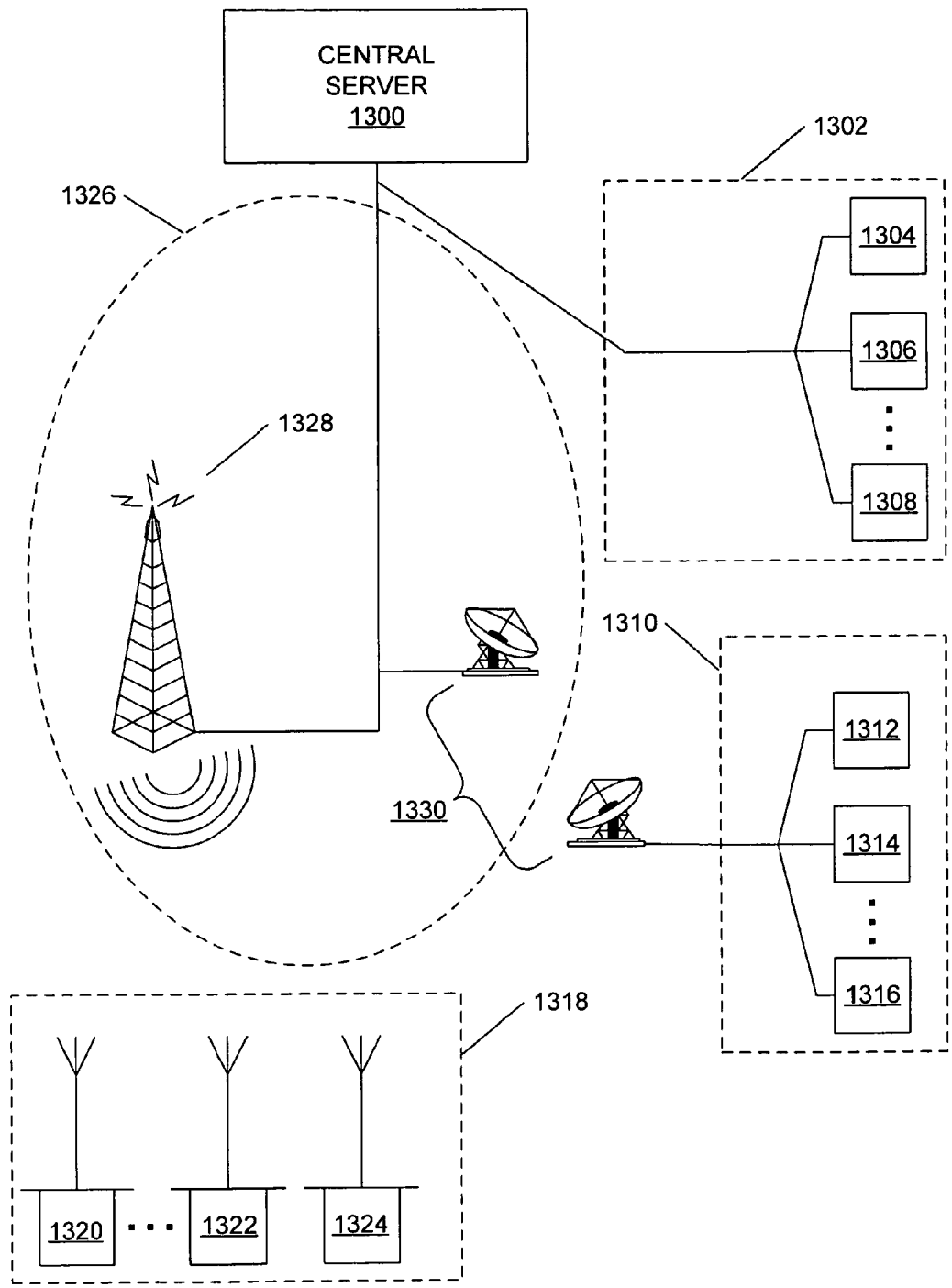
FIG. 13 shows a representative example of communications among participants and the central server to implement some aspects of the invention.

FIG. 13 is a schematic depiction of the above-described approach. It should be understood however, that this depiction is not intended to limit the approach in any way but rather is intended to place the approach in context—none of the particular elements (or their specific implementation details) being per se critical to use of the approach, the only critical aspects being the approach itself (as embodied in suitable computer executable form) and a computer of sufficient speed, storage and processing power to be capable of receiving the relevant data and operating on it according to the pertinent implementation of the approach as conceptually described above.

One example group of participants 1302 consists of one or more computer terminals 1304, 1306, 1208 connected to a central server 1300. The central server 1300 receives data and implements some variant of the approach described above to facilitate trading. A second group of participants 1310 also consists of one or more computer terminals 1312, 1314, 1316 connected to the central server 1300 via a communications network (1226). The communications network will typically be configured to include any one or more of the following communication media: "wired" (for example, electrical wiring or optical fiber or some combination thereof) or wireless (for example, radio 1328 or satellite 1330) or some combination thereof. The central server 1300 has sufficient processing power and programming to receive the data feed and directly operate on it as required to implement one of the techniques described herein.

A third example group of participants 1318 may be typified by the more powerful portable devices which are themselves computers, examples being general purpose devices such as laptop computers 1320, handheld or "palm" computers 1322, or special purpose devices such as specialized bond trading communication units 1324. Such devices are deemed unstructured or non-traditional because they may be proprietary or special purpose devices or otherwise "blur the line" between computers and other devices such as, for example, cell phones, cameras or gaming systems.

Simulation or Game-Specific Variants

Although the approach described herein will primarily be used to effect actual transactions among participants, simulated transactions employing the approach described herein, whether for purposes of gaming, education, research or analysis and/or the like are also contemplated. For example, the approach can be embodied in a commercially available computer program that can be installed on one or more user's personal computers, servers, or gaming devices such as GameCube, Xbox, PlayStation and the like, and in which multiple users conduct simulated transactions in an effort to amass the greatest value or a single user does so against a multiplicity of computer implemented prospective traders. Since simulations and games would generally be simplified or more limited versions of their commercial counterparts, differing primarily (in pertinent part) in the fact that no actual transfer may occur, be possible or desired outside the simulation or gaming environment, the above description is equally applicable to simulations and games in pertinent respects.

It should be understood that the description herein is only representative of illustrative embodiments. For the convenience of the reader, the above description has focused on a representative sample of possible embodiments, a sample that is illustrative of the principles of the present invention. It should be understood that the possible embodiments are not to be considered limitations on the invention as defined by the claims, or limitations on equivalents to the claims.

The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be straightforwardly implemented without departing from the spirit and scope of the present invention. It is therefore intended that the invention not be limited to the specifically described embodiments since numerous permutations and combinations of the above and implementations involving non-inventive substitutions for the above can be created, but the invention is to be defined in accordance with the claims that follow. It can be appreciated that many of those undescribed embodiments are within the scope of the following claims, and others are equivalent.

What is claimed is:

1. A computerized transaction method comprising:
   accepting offers at a computer from entities, the offers each comprising an identification of at least one transactable item and a value associated by each entity with the at least one transactable item, and each not indicating whether the offer is to buy or sell the at least one transactable item;
   identifying, by the computer, a median value derived from the values identified by the accepted offers; and
   initiating, by the computer, transactions among at least some of the entities from whom the offers were accepted such that;
   i) entities that submitted offers identifying values that are less than the median value are required to sell the at least one transactable item at the median value; and
   ii) entities that submitted offers identifying values that are greater than the median value are required to buy the at least one transactable item at the median value.

2. The method of claim 1, wherein the identifying comprises:
   treating a single offer of n units at a value of m as n individual offers at a value of m/n.

3. The method of claim 1, wherein the transactable item comprises money.

4. The method of claim 1, wherein the transactable item comprises goods.

5. The method of claim 1, wherein the transactable item comprises an intangible.

6. The method of claim 1, wherein:
   entities that submitted offers comprising respective identifications of values that are equal to the median value and further comprising respective identifications of deviation amounts along a first direction relative to the median value, are matched to entities that submitted offers comprising respective identifications of values that are equal to the median and further comprising respective identifications of deviation amounts along a second direction relative to the median value, opposite the first direction;
   those of the matched entities that submitted offers comprising respective identifications of positive deviation amounts are required to buy the at least one transactable item at the median price plus their respectively identified deviation amount; and
   those of the matched entities that submitted offers comprising respective identifications of values having a negative deviation amount are required to sell the at least one transactable item at the median price minus their respectively identified deviation amount.

7. The method of claim 1, wherein the transactions are only initiated by the computer for those offers having identified values that are within respectively identified deviation amounts relative to the median value.

8. The method of claim 6, wherein the deviation amount is specified by the entities that submitted the offers.

9. The method of claim 6, wherein the deviation amount is calculated from at least one of the offers.

10. The method of claim 6, wherein the deviation amount is calculated from the median value.

11. The method of claim 6, wherein the deviation amount is specified prior to accepting the offers.

12. A computerized gambling method comprising:

accepting inputs at a computer from entities, the inputs each comprising an identification of at least one transactable item and a value associated by each entity with a potential outcome of an event that is a subject of wagering;

identifying, by the computer, a median value derived from a number of transactable items identified by the accepted inputs; and initiating, by the computer, transactions among at least some of the entities from whom the inputs were accepted such that;

i) entities that submitted inputs for which the potential outcome matches an actual outcome are deemed winners if the value of the respective input is greater than at values having a deviation amount relative to the median value, and receive respective winning shares of transactable items; and ii) entities that submitted inputs for which the potential outcome matches the actual outcome are deemed losers if the value of the respective input is less than the median value, and lose their respective identified at least one transactable item.

13. The method of claim 12, wherein the value comprises an odds amount for the potential outcome.

14. The method of claim 12, wherein the value comprises a probability amount for the potential outcome.

15. The method of claim 12, wherein the value comprises a point spread amount for the potential outcome.

16. The method of claim 12, wherein the transactable item comprises money.

17. The method of claim 12, wherein the transactable item comprises goods.

18. The method of claim 12, wherein the transactable item comprises an intangible.

19. The method of claim 12 further comprising:

voiding inputs submitted at values equal to the median value.

20. The method of claim 12, wherein each winning entity's share is calculated based on the median value.

21. The method of claim 12, wherein the median value is calculated based on a ratio of identified transactable items associated with the potential outcome to identified transactable items associated with alternative potential outcomes.

* * * * *